United States Patent
Derouineau et al.

(10) Patent No.: US 7,578,136 B2
(45) Date of Patent: Aug. 25, 2009

(54) INTEGRATED POWER AND PRESSURIZATION SYSTEM

(75) Inventors: Jean-Luc Derouineau, Phoenix, AZ (US); Bjoern Schenk, Phoenix, AZ (US); Clarence Lui, Diamond Bar, CA (US)

(73) Assignee: Honeywell International Inc., Morristown, NJ (US)

( * ) Notice: Subject to any disclaimer, the term of this patent is extended or adjusted under 35 U.S.C. 154(b) by 226 days.

(21) Appl. No.: 11/165,729

(22) Filed: Jun. 23, 2005

(65) Prior Publication Data

US 2006/0231680 A1     Oct. 19, 2006

Related U.S. Application Data

(60) Provisional application No. 60/603,943, filed on Aug. 23, 2004.

(51) Int. Cl.
*F28B 9/00* (2006.01)
*F02C 6/08* (2006.01)

(52) U.S. Cl. ........................ 62/172; 60/39.07

(58) Field of Classification Search ............... 244/53 R, 244/53 A, 118.5; 60/39.07, 39.183, 39.33, 60/37.83; 62/172, 402
See application file for complete search history.

(56) References Cited

U.S. PATENT DOCUMENTS

| | | | |
|---|---|---|---|
| 2,618,470 A | 11/1952 | Brown et al. | |
| 2,767,561 A | 10/1956 | Seeger | |
| 2,777,301 A * | 1/1957 | Kuhn | 62/178 |
| 4,261,416 A * | 4/1981 | Hamamoto | 165/271 |
| 4,419,926 A * | 12/1983 | Cronin et al. | 454/74 |
| 4,503,666 A | 3/1985 | Christoff | |
| 4,684,081 A * | 8/1987 | Cronin | 244/58 |
| 4,963,174 A | 10/1990 | Payne | |
| 5,442,905 A * | 8/1995 | Claeys et al. | 60/785 |
| 5,701,755 A | 12/1997 | Severson et al. | |
| 5,813,630 A * | 9/1998 | Williams | 244/118.5 |
| 5,899,085 A | 5/1999 | Williams | |
| 5,956,960 A * | 9/1999 | Niggeman | 62/172 |
| 6,189,324 B1 | 2/2001 | Williams et al. | |
| 6,216,981 B1 | 4/2001 | Helm | |
| 6,283,410 B1 * | 9/2001 | Thompson | 244/59 |

FOREIGN PATENT DOCUMENTS

WO         9912810         3/1999

OTHER PUBLICATIONS

European Search Report dated Jan. 22, 2008 EP05255171.0.

* cited by examiner

*Primary Examiner*—Tien Dinh
(74) *Attorney, Agent, or Firm*—Ingrassia Fisher & Lorenz, P.C.

(57) ABSTRACT

An integrated power and pressurization management system supplies electrical power and cabin pressurization and cooling air during both airborne and ground operations. The system includes an integral auxiliary power unit (APU) that has a compressor, a motor-generator, and a power turbine all mounted on one shaft. The integral APU can supply compressed air for cabin pressurization and environmental cooling functions, and can generate electrical power for various electrical loads. The system further includes one or more electrically driven compressors.

14 Claims, 3 Drawing Sheets

INTEGRATED POWER AND PRESSURIZATION SYSTEM

CROSS-REFERENCES TO RELATED APPLICATIONS

This application claims the benefit of U.S. Provisional Application No. 60/603,943, filed Aug. 23, 2004.

TECHNICAL FIELD

The present invention relates to electric power and cabin pressurization and, more particularly, to an integrated system that provides both electrical power generation and cabin pressurization functions in an aircraft.

BACKGROUND

Electric power generation and cabin pressurization are functions that are implemented on most aircraft. These functions may need to be implemented during normal and abnormal flight conditions, and during aircraft ground operations. In many instances, each of these functions is implemented using separate subsystems and/or devices, which can increase overall system weight and costs.

Aircraft designs are trending toward more electric support platforms. Such design platforms typically implement a "no bleed air" concept, and rely on electrically driven compressors to produce the air that is used to pressurize and/or cool the aircraft cabin. Moreover, such design platforms may not rely solely on the electric power from the engine to provide electricity and pressurization air, especially when on the ground or in the unlikely event the engine generators do not operate normally. Thus, such aircraft may need an auxiliary source of power, which is traditionally performed by an APU (auxiliary power unit).

It is thus seen that even with the more electric designs, various subsystems and/or devices may be included, which can increase overall system weight and/or costs.

Hence, there is a need for a system that implements pressurization and power management on an aircraft that addresses the above-noted drawbacks. Namely, a system that does not rely on various subsystems and/or devices to implement these functions while the aircraft is in the air, on the ground, or experiencing certain abnormal conditions. This invention provides significant weight and part reduction, compared to traditional systems, to perform the electric power and cabin pressurization functions.

BRIEF SUMMARY

The present invention provides an integrated power and pressurization management system for an aircraft.

In one embodiment, and by way of example only, an integrated power and cabin pressurization system for selectively generating electrical power and supplying cabin pressurization air to an aircraft cabin includes a combustor, a power turbine, a motor-generator, and a compressor. The combustor has a compressed air inlet adapted to receive a flow of compressed air, and a combustor air outlet. The power turbine has an air inlet coupled to receive a flow of air from either the combustor or the aircraft cabin, and is operable, upon receipt of the flow of air, to supply a rotational drive force. The motor-generator is coupled to the power turbine and is configured to operate in either a motor mode, in which the motor-generator supplies a rotational drive force, or a generate mode, in which the motor-generator receives the rotational drive force supplied by the power turbine. The compressor has a ram air inlet and a compressed air outlet. The compressor is coupled to only receive the rotational drive force supplied from the power turbine or the motor-generator and no other electrically powered prime movers, and is operable, upon receipt of the rotational drive force, to supply compressed air to the compressed air inlet via the compressor compressed air outlet.

In yet another exemplary embodiment, an integrated power and cabin pressurization system for selectively generating electrical power and supplying cabin pressurization air to an aircraft cabin, includes a combustor, a power turbine, a motor-generator, a cooling turbine, and a compressor. The combustor has a compressed air inlet adapted to receive a flow of compressed air, and a combustor air outlet. The power turbine has an air inlet coupled to receive a flow of air from either the combustor or the aircraft cabin, and is operable, upon receipt of the flow of air, to supply a rotational drive force. The motor-generator is coupled to the power turbine and is configured to operate in either a motor mode, in which the motor-generator supplies a rotational drive force, or a generate mode, in which the motor-generator receives the rotational drive force supplied by the power turbine. The cooling turbine is coupled to the power turbine and the motor-generator, and has an air inlet coupled to receive a flow of air. The cooling turbine is operable, upon receipt of the flow of air, to assist in supplying the rotational drive force. The compressor has a ram air inlet and a compressed air outlet. The compressor is coupled to receive the rotational drive force supplied from the power turbine, the cooling turbine, or the motor-generator and no other electrically powered prime movers, and is operable, upon receipt of the rotational drive force, to supply compressed air to the compressed air inlet via the compressor compressed air outlet.

In yet another exemplary embodiment, an integrated power and cabin pressurization system for selectively generating electrical power and supplying cabin pressurization air to an aircraft cabin includes a combustor, a power turbine, a motor-generator, a compressor, and a fuel cell. The combustor has a compressed air inlet adapted to receive a flow of compressed air, and a combustor air outlet. The power turbine has an air inlet coupled to receive a flow of air from either the combustor or the aircraft cabin, and is operable, upon receipt of the flow of air, to supply a rotational drive force. The motor-generator is coupled to the power turbine and is configured to operate in either a motor mode, in which the motor-generator supplies a rotational drive force, or a generate mode, in which the motor-generator receives the rotational drive force supplied by the power turbine. The compressor has a ram air inlet and a compressed air outlet. The compressor is coupled to receive the rotational drive force supplied from the power turbine or the motor-generator, and is operable, upon receipt of the rotational drive force, to supply compressed air to the compressed air inlet via the compressor compressed air outlet. The fuel cell is disposed between the compressed air inlet and the compressed air outlet.

In yet a further exemplary embodiment, an integrated power and cabin pressurization system for selectively generating electrical power and supplying cabin pressurization air to an aircraft cabin includes a combustor, a power turbine, a motor-generator, a compressor, and an air cooling system. The combustor has a compressed air inlet adapted to receive a flow of compressed air, and a combustor air outlet. The power turbine has an air inlet coupled to receive a flow of air from either the combustor or the aircraft cabin, and is operable, upon receipt of the flow of air, to supply a rotational drive force. The motor-generator is coupled to the power turbine and is configured to operate in either a motor mode, in which the motor-generator supplies a rotational drive force, or a generate mode, in which the motor-generator receives the rotational drive force supplied by the power turbine. The compressor has a ram air inlet and a compressed air outlet. The compressor is coupled to only receive the rotational drive force supplied from the power turbine or the motor-generator and no other electrically powered prime movers, and is operable, upon receipt of the rotational drive force, to supply compressed air to the compressed air inlet via the compressor compressed air outlet. The air cooling system includes an airflow duct, a cooling system fan, and a fan motor-generator. The cooling system fan is disposed within the airflow duct, and the fan motor-generator is coupled to the fan.

Other independent features and advantages of the preferred integrated power and pressurization management system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
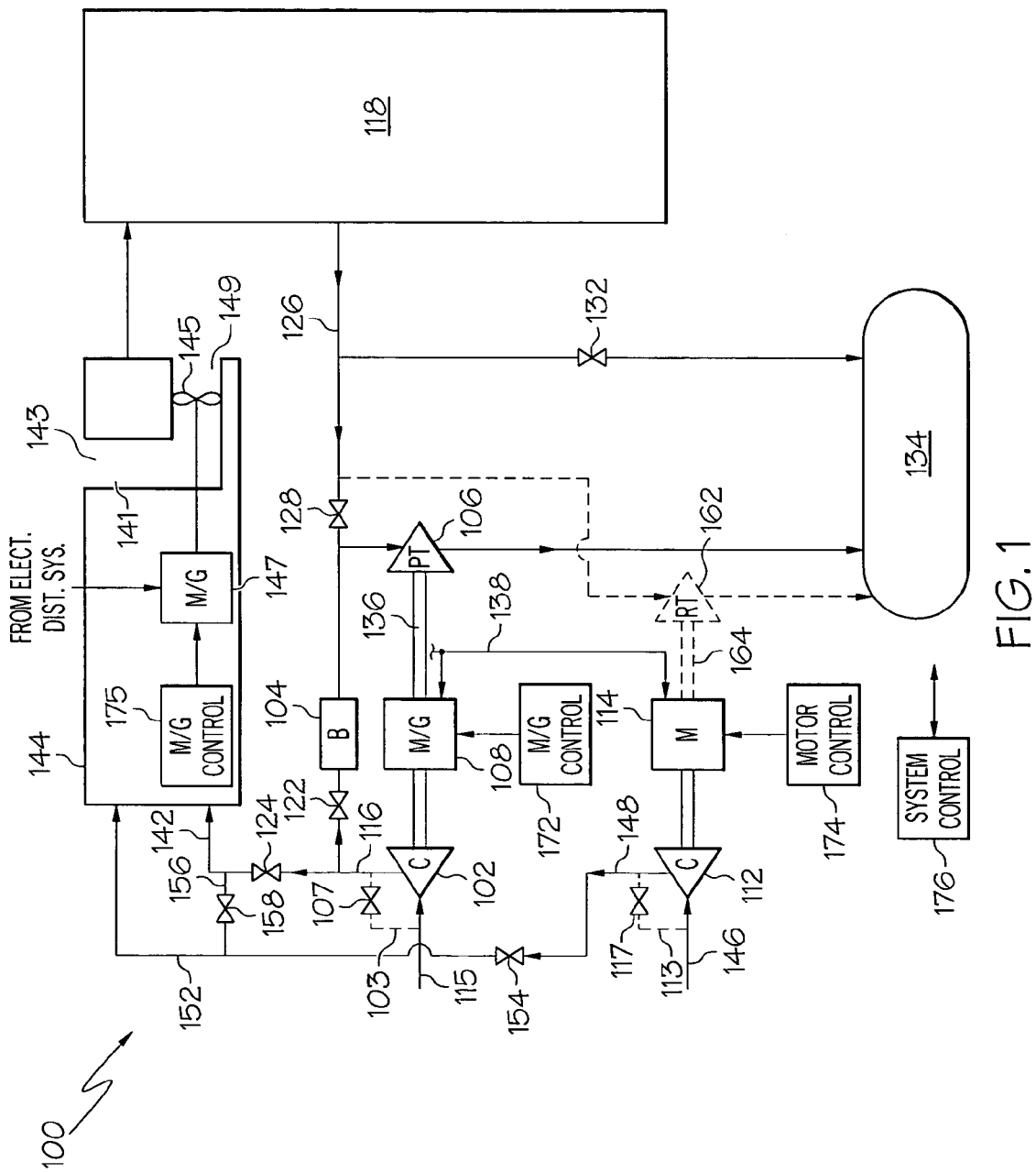
FIG. 1 is a schematic representation of an exemplary embodiment of an integrated power and pressurization management system.
Figure 2:
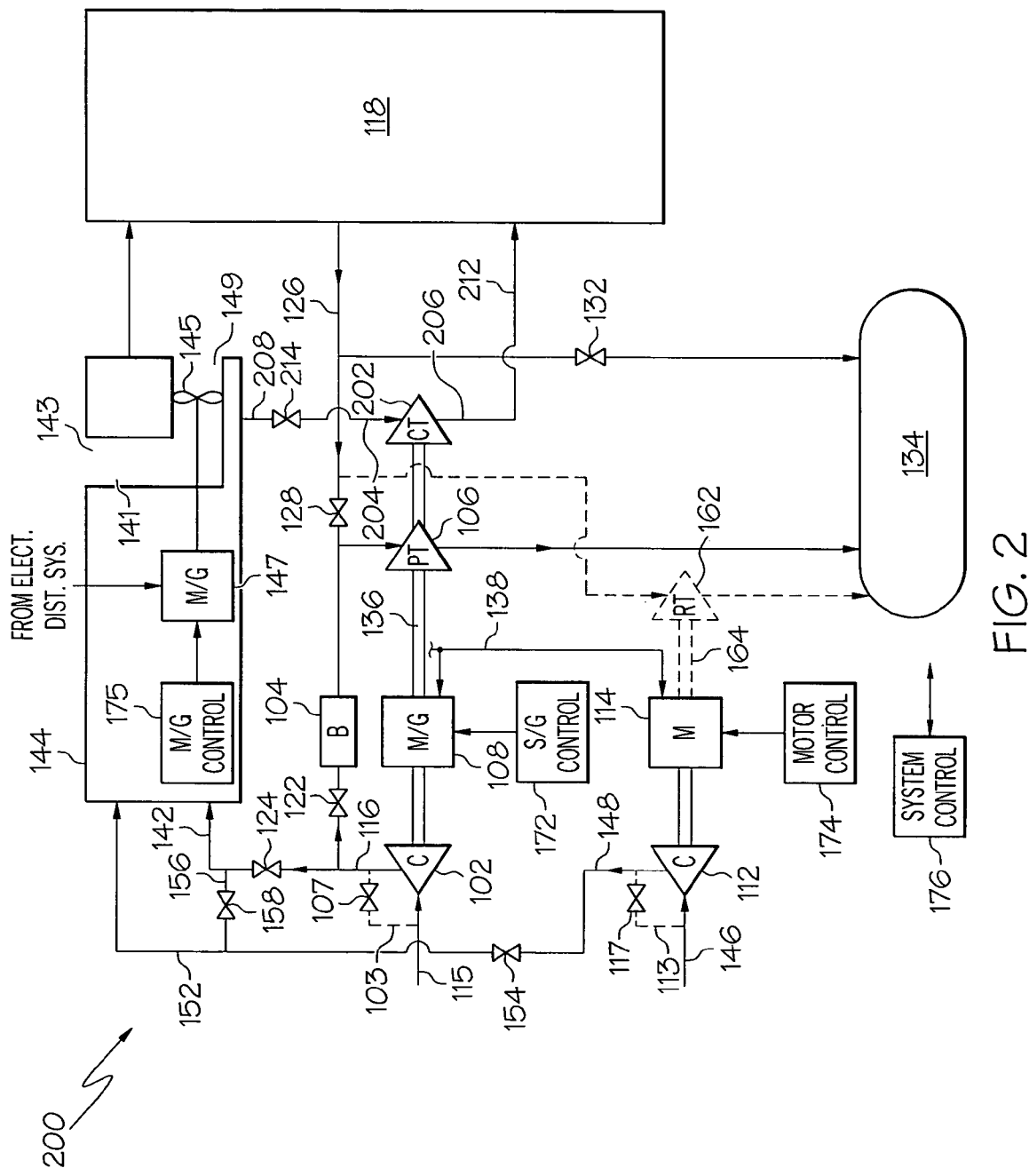
FIG. 2 is a schematic representation of an exemplary alternative embodiment of an integrated power and pressurization management system.

Turning now to the description, and with reference first to FIG. 1, an embodiment of an exemplary integrated power and pressurization system 100 is shown in simplified schematic form. The system 100 depicted in FIG. 1 includes a first compressor 102, a combustor 104, a power turbine 106, a motor-generator unit 108, a second compressor 112, and a motor 114. It will be appreciated that although the system 100 is depicted as including only the first and second compressors 102, 112, the system 100 could be implemented with more than this number of compressors. For example, the system 100 could include the first compressor 102, the second compressor 112, and one or more additional compressors. The additional compressors, if included, could be powered from the same motor 114 as the second compressor 112, but are preferably each powered from a separate, individual electrical motor. Moreover, in an alternate embodiment, which is illustrated in FIG. 2 and is described in more detail further below, the system 100 additionally includes a cooling turbine.

Returning now to FIG. 1, it is seen that the first compressor 102 includes a ram air inlet 115 and a compressed air outlet 116. During operation, the first compressor 102 draws ram air into the ram air inlet 115, compresses the ram air, and supplies compressed air via the compressed air outlet 116. The compressed air supplied to the first compressor compressed air outlet 116 may then be directed into the combustor 104, an aircraft cabin 118, or both. It will be appreciated that the first compressor 102 may be any one of numerous types of compressors now known or developed in the future. In a particular preferred embodiment, however, the compressor is a variable flow compressor.

In the depicted embodiment, the flow of compressed air in the first compressor compressed air outlet 116 is controlled via a combustor supply valve 122 and a first cabin air supply valve 124. The combustor supply valve 122 is disposed between the first compressor compressed air outlet 116 and the combustor 104, and the first cabin air supply valve 124 is disposed between the first compressor compressed air outlet 116 and aircraft cabin 118. Thus, when the combustor supply valve 122 is open, compressed air is supplied to the combustor 104, and when the first cabin air supply valve 124 is open, compressed air is supplied to the aircraft cabin 118. It will be appreciated that although the combustor supply valve 122 and the first cabin air supply valve 124 are depicted as separate valves this is merely exemplary. Indeed, in an alternative embodiment, a single three-way valve could be used to implement the functionality of these valves 122, 124. It will additionally be appreciated that the combustor supply valve 122 and the first cabin air supply valve 124, when implemented separately, could be implemented as any one of numerous types of valves. In a particular preferred embodiment, however, the combustor supply valve 122 is implemented as any one of numerous types of conventional open/shut valves, and the first cabin air supply valve 124 is implemented as any one of numerous types of conventional pressure regulating valves.

Before proceeding further it is noted that the first and second compressors 102 and 112 could additionally include a recirculation line 103 and 113, respectively, each having a compressed air recirculation valve 107 and 117 disposed thereon. It is noted that these additional components are shown in phantom in FIG. 1. The recirculation lines 103, 113 extend between the respective first and second compressor inlets 115, 146 and outlets 116, 148 and, when the respective compressed air recirculation valve 107, 117 is open, allows compressed air to recirculate back to the compressor inlet 115, 146. Compressed air may be recirculated back to the compressor inlets 115, 146 to, for example, heat the air further when the cabin 118 is to be warmed instead of cooled, to de-ice the compressor inlet 115, 146, if needed, or to prevent compressor surges.

If combustor 104 operation is desired, the combustor supply valve 122 is opened to allow compressed air in the first compressor compressed air outlet 116 to flow into the combustor 104. As is generally known, the combustor 104 is also configured to receive a flow of fuel from a non-illustrated fuel source. The fuel and compressed air are mixed within the combustor 104, and are ignited to produce relatively high-energy air. It will be appreciated that the combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor configuration 104 used, the relatively high-energy air that is generated in the combustor 104 is supplied to the power turbine 106. As the high-energy air expands through the power turbine 106, it impinges on turbine blades (not shown in FIG. 1), which causes the power turbine 106 to rotate. Alternatively, rather than using high-energy air generated in the combustor 104, the system 100 may be configured such that air that is exhausted from the aircraft cabin 118 is directed into the power turbine 106, causing the power turbine 106 to rotate. To do so, the system 100 includes a cabin air exhaust conduit 126, which is coupled between the power turbine 106 and the aircraft cabin 118. A turbine air supply valve 128 is mounted on the cabin air exhaust conduit 126, and is moveable between an open position and a closed position. In the open position, air exhausted from the aircraft cabin 118 flows through the cabin air exhaust conduit 126 and into the power turbine 106. In the closed position, air from the aircraft cabin 118 cannot flow into the power turbine 106. As FIG. 1 also shows, cabin air exhaust conduit 126 is additionally coupled to a cabin air exhaust valve 132. The cabin air exhaust valve 132 is moveable between an open position and a closed position and, when open, fluidly communicates the cabin air exhaust conduit 126 with an external environment 134 such as, for example, the ambient environment outside of the aircraft fuselage (not shown).

Preferably, when the power turbine 106 is being supplied with air exhausted from the aircraft cabin 118, the combustor 104 is not supplying high-energy air to the turbine. Conversely, when the power turbine 106 is being supplied with high-energy air from the combustor 104, air exhausted from the aircraft cabin 118 is not being supplied to the power turbine 106. Thus, when the turbine air supply valve 128 is open the combustor supply valve 122 is preferably closed, and vice-versa, when the combustor supply valve 122 is open the turbine air supply valve 128 is preferably closed.

It will be appreciated that the power turbine 106 may be implemented using any one of numerous types of turbines now known or developed in the future including, for example, a vaned radial turbine, a vaneless radial turbine, and a vaned axial turbine. No matter the particular type of turbine that is used, the power turbine 106 includes an output shaft 136 that drives the compressor 102. Moreover, as will now be discussed, depending on the mode in which the system 100 is operating, the power turbine 106, via the output shaft 136, may also drive the main motor-generator 108, or alternatively the power turbine 106 may be driven by the main motor-generator 108.

The main motor-generator 108 is configured to be selectively operated in either a motor mode or a generate mode. In the motor mode, the main motor-generator 108 receives electrical power from, for example, an electrical distribution system 138, which causes the main motor-generator 108 to rotate and supply mechanical output power to, for example, the compressor 102. In the generate mode, the main motor-generator 108 receives mechanical input power from, for example, the power turbine 106 and generates electrical power, which is supplied to, for example, the electrical distribution system 138.

It will thus be appreciated that the main motor-generator 108, when operating in the motor mode, may be used to drive the compressor 102 and start the power turbine 106 and, when operating in the generate mode, may be used to supply electrical power. It will be appreciated that the main motor-generator 108 may be configured to implement any one of numerous types of motor-generators 108 including, for example, permanent magnet, induction, and switched reluctance type motor-generators.

As was previously noted, the compressed air supplied by the first compressor 102, or at least a portion thereof, may also be directed into the aircraft cabin 118. To do so, the first cabin air supply valve 124 is moved to its open position, which allows compressed air to flow into a first cabin air supply conduit 142 that is coupled between the first compressor compressed air outlet 116 and the aircraft cabin 118. Preferably, the compressed air in the cabin air supply conduit 142 is cooled, via an air cooling system 144, prior to being supplied to the aircraft cabin 118. The air cooling system 144 may be implemented as any one of numerous types of cooling systems including, for example, an air cycle system, a vapor cycle system, or one or more heat exchangers, just to name a few. In the embodiment depicted in FIG. 2, and which is described further below, the air cooling system 144 is preferably implemented as an air cycle system.

No matter the specific implementation, the air cooling system 144, at least in the depicted embodiment, uses a flow of air to assist in cooling the compressed air. To this end, the air cooling system 144 includes an airflow duct 141 having a ram air inlet 143 and an air outlet 149, a cooling fan 145, and a motor-generator 147. During ground operations, the motor-generator 147 operates in the motor mode and drives the cooling fan 145, which draws air into and through the airflow duct 141. However, during flight operations, ram air flow into the airflow duct 141 is sufficient, and the cooling fan 145 is not driven by the motor-generator 147. Instead, ram air flow through the airflow duct 141 is of a sufficient magnitude to drive the cooling fan 145, which in turn drives the motor-generator 147. Thus, during air operations, the motor-generator 147 is preferably operated in the generate mode to supply electrical power.

It is also seen that the aircraft cabin 118 may additionally, or instead, be supplied with compressed air from the second compressor 112. The second compressor 112, similar to the first compressor 102, includes a ram air inlet 146 and a compressed air outlet 148. However, unlike the first compressor 102, the second compressor 112 is not driven by the power turbine 106 or the main motor-generator 108, but is instead driven by the motor 114. The motor 114, when energized from, for example, the electrical distribution system 138, supplies a rotational drive force to the second compressor 112. In response to the rotational drive force, the second compressor 112 draws ram air into its ram air inlet 146, compresses the ram air, and supplies compressed air via its compressed air outlet 148. As with the first compressor 102, it will be appreciated that the second compressor 112 may be any one of numerous types of compressors now known or developed in the future. In a particular preferred embodiment, however, the compressor is a high pressure ratio compressor.

A second cabin air supply conduit 152 is coupled between the second compressor compressed air outlet 148 and the aircraft cabin 118, and has a second cabin air supply valve 154 mounted thereon. The second cabin air supply valve 154 is moveable between an open position and closed position. In the open position, compressed air from the second compressor 112 flows through the second cabin air supply conduit 152 and into the aircraft cabin 118, preferably via the cooling system 144. It will be appreciated that the second cabin air supply valve 154 may be implemented as any one of numerous types of valves. In a particular preferred embodiment, however, the second cabin air supply valve 154 is implemented as any one of numerous types of conventional open/shut valves. It will additionally be appreciated that the system 100 could be implemented without the valve 154.

In the depicted embodiment, the system 100 additionally includes a cross-connect conduit 156 coupled between the first and second cabin air supply conduits 142, 152. A cross-connect valve 158 is mounted on the cross-connect conduit 156 and is moveable between an open position and the closed position. In the open position, the cross-connect conduit 156 fluidly communicates the first and second cabin air supply conduits 142, 152 with one another, and in the closed position the cross-connect conduit 156 does not fluidly communicate the first and second cabin air supply conduits 142, 152 with one another. Thus, if only one of the compressors 102, 112 is operational, or it is desirable to use only one of the compressors 102, 112 to supply compressed air to the aircraft cabin 118, the cross-connect valve 158 may be opened, allowing either the first compressor 102 or the second compressor 112 to supply compressed air to the aircraft cabin 118 via the first and second cabin air supply conduits 142, 152. It will be appreciated that the system 100 could be implemented without the cross connect conduit 156. It will additionally be appreciated that the second cabin air supply conduit 152 could be coupled to the first cabin air supply conduit 148.

The electrical distribution system 138, as was noted above, is used to supply electrical power to the motor 114, and is further used to supply electrical power to, or to receive electrical power from, the main motor-generator 108, depending upon whether the main motor-generator 108 is operating in the motor mode or the generate mode. The electrical distribution system 138 includes various electrical distribution buses, switches, breakers, contacts, or the like, and one or more batteries. A detailed description of the electrical distribution system 138 is not needed to fully describe and enable the present invention, and will therefore not be further described.

The system 100 additionally includes one or more controllers to control overall system operation. In the depicted embodiment, the system 100 includes four controllers—a main motor-generator controller 172, a motor controller 174, a fan motor-generator controller 175, and a system controller 176. It will be appreciated, however, that the use of four controllers is merely exemplary, and that the system 100 could be implemented with a single controller or with more than four controllers.

Nonetheless, in the depicted embodiment the main motor-generator controller 172 is electrically coupled to the main motor-generator 108 and controls and regulates the main motor-generator 108. In particular, the main motor-generator controller 172, based on input signals from the system controller 176, or from one or more non-illustrated sensors or other externals systems and/or devices, selectively switches the operational mode of main motor-generator 108 between the motor mode and the generate mode. The main motor-generator controller 172 also regulates the mechanical and electrical power output of the main motor-generator 108 in the motor mode and generate mode, respectively.

The fan motor-generator controller 175 is electrically coupled to the fan motor-generator 147 and controls and regulates the fan motor-generator 147. The fan motor-generator 147 operates similar to the main motor-generator controller 172 and will therefore not be further described. It will be appreciated that the main motor-generator controller 172 and the fan motor-generator controller 175 may implement any one of numerous known motor and generator control laws, and may be physically implemented using any one of numerous known circuit configurations for implementing the respective control laws.

The motor controller 174 is electrically coupled to the motor 114 and controls and regulates the motor 114. In particular, the motor controller 174, based on input signals from the system controller 176, or from one or more non-illustrated sensors or other externals systems and/or devices, controls motor rotational speed and regulates the mechanical power output of the motor 114. It will be appreciated that the motor controller 174 may implement any one of numerous known motor control laws, and may be physically implemented using any one of numerous known circuit configurations for implementing the respective control laws.

The system controller 176 controls the overall operation of the system 100. In this regard, the system controller 176 receives various input signals from various components with the system 100 and/or from one or more external systems, and, in response to these signals, supplies command signals representative of a system operational configuration to various system components including, for example, the motor-generator controller 172, the motor controller 174, the combustor 104, the power turbine 106, the motor 114, the various valves 122, 124, 128, 132, 154, 158, and various switches. The system components respond to the command signals from the system controller 176, and cause the system 100 to operate in the commanded operational configuration.

With reference to FIG. 2, the previously mentioned alternative embodiment is shown and will now be described. Before doing so, it is noted that the system 200 depicted in FIG. 2 is preferably implemented using the same devices and components as the system 100 depicted in FIG. 1. As such, like reference numerals in FIGS. 1 and 2 refer to like devices and components. Moreover, the like devices and components of the two systems 100, 200 will not be further described.

Turning now to the description of the alternate system 200, it is seen that this system 200 is quite similar to that shown in FIG. 1, in that it includes at least the same devices and components as the system of FIG. 1. However, the alternate system 200 additionally includes a cooling turbine 202 and the air cooling system 144 is preferably implemented as an air cycle system.

The cooling turbine 202 is mounted on the same shaft 136 as the first compressor 102, the power turbine 106, and the motor-generator 108, and includes an air inlet 204 and an air outlet 206. The air inlet 204 is coupled to the air cooling system 144, via a cooling turbine supply conduit 208, and the air outlet 206 is coupled to the aircraft cabin 118 via a cooling turbine exhaust conduit 212. A cooling turbine supply valve 214 is mounted on the cooling turbine supply conduit 208 and is moveable between an open position and a closed position. In the open position, a portion of the air that is cooled in the air cooling system 144 is diverted into the cooling turbine 202, via the air inlet 204. As the cooled air expands through the cooling turbine 202, work is extracted from the air, cooling the air even further. This further cooled air is exhausted out the cooling turbine air outlet 206, into and through the cooling turbine exhaust conduit 212, and into the aircraft cabin 118. Though not depicted in FIG. 2, it will be appreciated that the further cooled air that is exhausted from the cooling turbine 202 and the cooled air that is supplied from the air cooling system 144 are preferably supplied to a mixer, prior to being discharged into the cabin 118.

The air cooling system 144, as was previously mentioned, is preferably implemented as an air cycle system. In the depicted embodiment, the air cycle system 144 is implemented with a pair of air cycle machines (not shown), though it will be appreciated that the system could be implemented with various numbers of air cycle machines.

Figure 3:
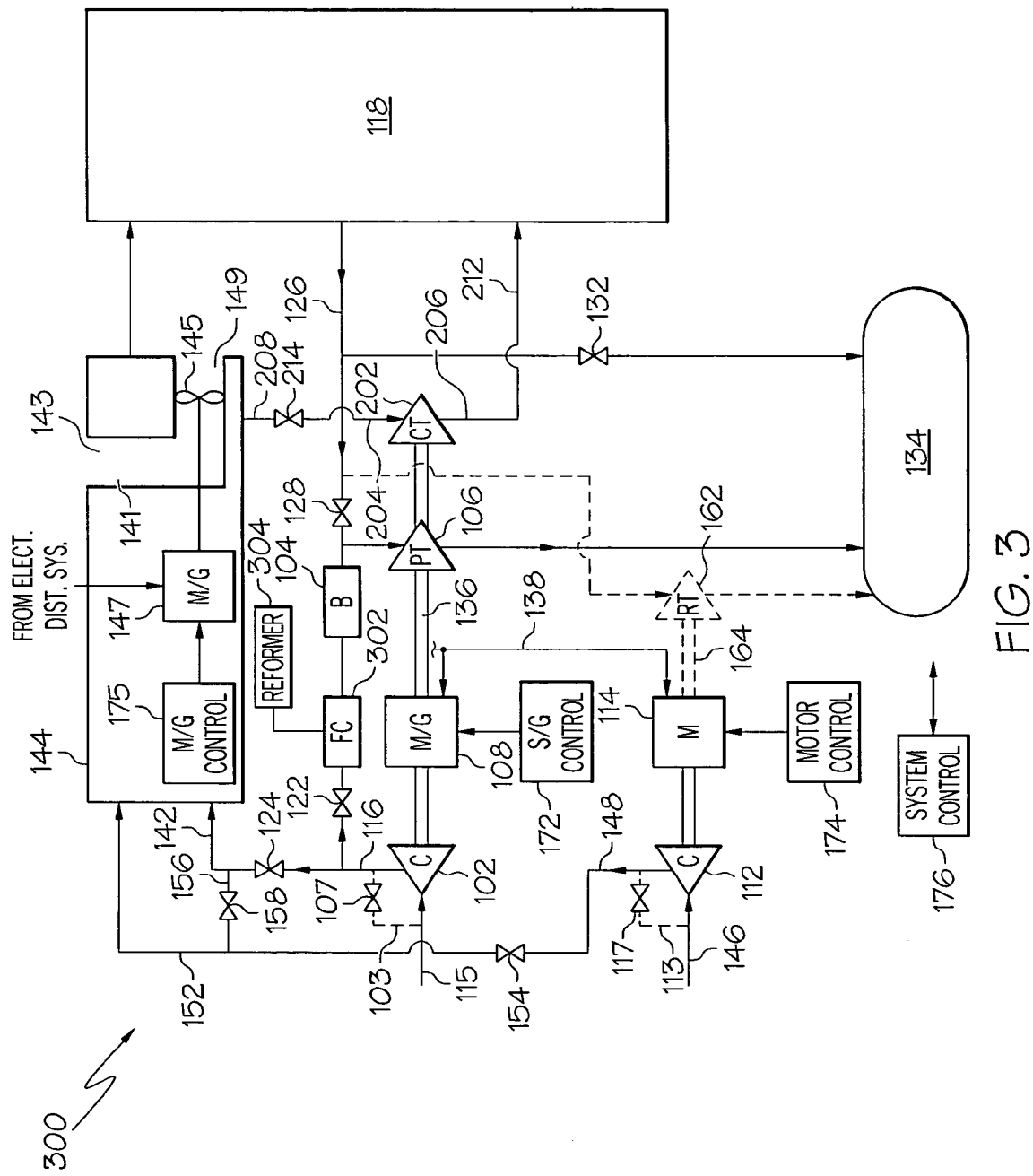
FIG. 3 is a schematic representation of yet another exemplary alternative embodiment of an integrated power and pressurization management system.

In yet another alternative embodiment, which is shown in FIG. 3, the system 300 further includes a fuel cell 302 and a fuel reformer 304. The fuel cell 302 is disposed between the first compressor 102 and the combustor 104, and is used to generate electrical power. A fuel cell 302, as is generally known, is an electrochemical energy conversion device that converts fuel into electricity by catalytically reacting fuel that is supplied to the fuel cell 302 to create an electric current. The fuel supplied to the fuel cell 302 may vary, depending on the particular type of fuel being used. In the depicted embodiment, the fuel is hydrogen and oxygen. More specifically, the fuel reformer 304 generates the hydrogen from a supply of fuel, and air from the first compressor 102 is used to supply the oxygen. Although shown implemented in the system configuration of FIG. 2, it will be appreciated that the fuel cell 302 and fuel reformer 304 could also be implemented in the system shown in FIG. 1. It will additionally be appreciated that the fuel reformer 304 need not be included if a supply of hydrogen is available.

In each of the embodiments described above and depicted in FIGS. 1-3, it will be appreciated that a recovery turbine 162 could additionally be included. In particular, and as shown in phantom in FIGS. 1-3, the recovery turbine 162, if included, is mounted on the same shaft 164 as the first compressor 112 and the motor 114, and is in fluid communication with the cabin air exhaust conduit 126. Thus, the recovery turbine 162 can be used to recover some energy from the air that is exhausted from the aircraft cabin 118.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An integrated power and cabin pressurization system for selectively generating electrical power and supplying cabin pressurization air to an aircraft cabin, the system comprising:
   a combustor having a combustor air inlet and a combustor air outlet, the combustor air inlet adapted to receive a flow of compressed air;
   a power turbine having an air inlet coupled to selectively receive a flow of air from the combustor and to selectively receive a flow of air from the aircraft cabin not via the combustor, the power turbine operable, upon receipt of the flow of air, to supply a rotational drive force;
   a motor-generator coupled to the power turbine and configured to operate in either a motor mode, in which the motor-generator supplies a rotational drive force, or a generate mode, in which the motor-generator receives the rotational drive force supplied by the power turbine;
   a compressor having a ram air inlet and a compressed air outlet, the compressor coupled to only receive the rotational drive force supplied from the power turbine or the motor-generator and no other electrically powered prime movers, the compressor operable, upon receipt of the rotational drive force, to supply compressed air to the combustor air inlet via the compressor compressed air outlet;
   a cabin air exhaust conduit coupled between the power turbine air inlet and the aircraft cabin;
   a turbine air supply valve mounted on the cabin air exhaust conduit and moveable between an open position, in which the power turbine air inlet is in fluid communication with the aircraft cabin, and a closed position, in which the power turbine air inlet is not in fluid communication with the aircraft cabin;
   a first cabin air supply conduit coupled between the compressed air outlet and the aircraft cabin;
   a first cabin air supply valve mounted on the cabin air supply conduit and moveable between an open position, in which the compressed air outlet is in fluid communication with the aircraft cabin, and a closed position, in which the compressed air outlet is not in fluid communication with the aircraft cabin;
   an electric motor operable to supply a rotational drive force;
   a second compressor having a second compressor ram air inlet and a second compressor compressed air outlet, the second compressor coupled to only receive the rotational drive force supplied from the electric motor and operable, upon receipt thereof, to supply compressed air to the second compressor compressed air outlet;
   a second cabin air supply conduit coupled between the second compressor compressed air outlet and the aircraft cabin; and
   a second cabin air supply valve mounted on the second cabin air supply conduit and moveable between an open position, in which the second compressor compressed air outlet is in fluid communication with the aircraft cabin, and a closed position, in which the second compressor compressed air outlet is not in fluid communication with the aircraft cabin.

2. The system of claim 1, further comprising:
   a cooling turbine coupled to the power turbine and having an air inlet coupled to receive a flow of air, the cooling turbine operable, upon receipt of the flow of air, to assist the power turbine in supplying the drive force.

3. The system of claim 2, wherein the cooling turbine is further operable to cool the received flow of air.

4. The system of claim 1, further comprising:
   a combustor supply valve coupled between the compressed air outlet and the combustor air inlet, the combustor supply valve moveable between at least a first position, in which the compressor compressed air outlet is in fluid communication with the combustor air inlet, and a second position, in which the compressor compressed air outlet is not in fluid communication with combustor air inlet.

5. The system of claim 1, further comprising:
   a cabin air exhaust valve mounted on the cabin air exhaust conduit and moveable between an open position, in which the aircraft cabin is in fluid communication with an external environment, and a closed position, in which the aircraft cabin is not in fluid communication with the external environment.

6. The system of claim 1, further comprising:
   an air cooling system coupled between the first cabin air supply conduit and the aircraft cabin, the air cooling system operable to cool the compressed air prior to it being discharged into the aircraft cabin.

7. The system of claim 6, wherein the air cooling system comprises:
   an airflow duct;
   a cooling system fan disposed within the airflow duct; and
   a fan motor-generator coupled to the fan.

8. The system of claim 1, wherein the second cabin air supply valve is a pressure regulating valve configured to regulate compressed air pressure to the aircraft cabin.

9. The system of claim 1, further comprising:
   a battery electrically coupled to the motor-generator, the battery configured to (i) supply electrical power to the motor-generator when the motor-generator is operating in the motor mode and (ii) receive electrical power from the motor-generator when the motor-generator is operating in the generate mode.

10. The system of claim 1, further comprising:
    a motor-generator controller coupled to the motor-generator and operable to control the motor-generator to operate in either the motor mode or the generate mode.

11. The system of claim 1, further comprising:
a motor controller coupled to the motor.

12. The system of claim 1, further comprising:
a fuel cell disposed between the combustor air inlet and the compressed air outlet.

13. The system of claim 1, further comprising:
a recovery turbine coupled to the second compressor, the recovery turbine having an air inlet coupled to receive a flow of air from the aircraft cabin and operable, upon receipt of the flow of air, to assist the power turbine in supplying the rotational drive force.

14. The system of claim 1, further comprising:
a system controller in operable communication with, and configured to supply commands representative of system operational configuration to at least partially control, the motor-generator, the motor, the combustor, the power turbine, the turbine air supply valve, the first cabin air supply valve, and the second cabin air supply valve.

* * * * *